US012802708B2

(12) United States Patent
Seki et al.

(10) Patent No.: US 12,802,708 B2
(45) Date of Patent: Nov. 17, 2026

(54) SIGNAL ANALYSIS SYSTEM, SIGNAL ANALYSIS METHOD AND PROGRAM

(71) Applicant: NTT, Inc., Tokyo (JP)

(72) Inventors: Shogo Seki, Musashino (JP); Hirokazu Kameoka, Musashino (JP); Takuhiro Kaneko, Musashino (JP); Ko Tanaka, Musashino (JP)

(73) Assignee: NTT, Inc., Tokyo (JP)

( * ) Notice: Subject to any disclaimer, the term of this patent is extended or adjusted under 35 U.S.C. 154(b) by 121 days.

(21) Appl. No.: 18/836,522

(22) PCT Filed: Feb. 18, 2022

(86) PCT No.: PCT/JP2022/006523
§ 371 (c)(1),
(2) Date: Aug. 7, 2024

(87) PCT Pub. No.: WO2023/157207
PCT Pub. Date: Aug. 24, 2023

(65) Prior Publication Data
US 2025/0140278 A1 May 1, 2025

(51) Int. Cl.
*G10L 25/18* (2013.01)
*G10L 25/30* (2013.01)

(52) U.S. Cl.
CPC .............. *G10L 25/18* (2013.01); *G10L 25/30* (2013.01)

(58) Field of Classification Search
CPC ......... G10L 25/18; G10L 25/30; G10L 25/51; G10L 2021/0135; G10L 21/007
See application file for complete search history.

(56) References Cited

U.S. PATENT DOCUMENTS

2020/0074985 A1* 3/2020 Clark ...................... G10L 15/16

FOREIGN PATENT DOCUMENTS

JP H09090993 A 4/1997
JP H10254473 A 9/1998
(Continued)

OTHER PUBLICATIONS

Kameoka, Hirokazu, et al. "ACVAE-VC: Non-parallel voice conversion with auxiliary classifier variational autoencoder." IEEE/ACM Transactions on Audio, Speech, and Language Processing 27.9 (2019): 1432-1443. (Year: 2019).*
(Continued)

*Primary Examiner* — Anne L Thomas-Homescu
(74) *Attorney, Agent, or Firm* — Harness, Dickey & Pierce, P.L.C.

(57) ABSTRACT

A signal analysis system includes: an acquisition unit configured to acquire a conversion network trained by using a sequence of a first mel-spectrogram in a machine learning scheme of acoustic conversion based on a classifier variational autoencoder; and a converter that converts a sequence of a second mel-spectrogram of an input acoustic signal into a sequence of a third mel-spectrogram of a target acoustic signal using the conversion network. The classifier variational autoencoder may perform learning of the conversion network using a task of complementing a missing frame in the sequence of the first mel-spectrogram. The classifier variational autoencoder may perform learning of the conversion network using a sequence of the first mel-spectrogram of the acoustic signal on which a noise signal is superimposed.

5 Claims, 9 Drawing Sheets

(56) References Cited

FOREIGN PATENT DOCUMENTS

| | | | | | |
|---|---|---|---|---|---|
| JP | 2000338986 | A | | 12/2000 | |
| JP | 2020135127 | A | | 8/2020 | |
| KR | 102176302 | B1 | * | 11/2020 | ......... G10L 21/0272 |
| WO | WO-2019163849 | A1 | * | 8/2019 | ............. G06N 3/047 |
| WO | WO-2019240228 | A1 | * | 12/2019 | ........... G10L 21/007 |
| WO | 2020/004363 | A1 | | 1/2020 | |
| WO | WO-2020036178 | A1 | * | 2/2020 | ........... G10L 21/007 |
| WO | WO-2021234967 | A1 | * | 11/2021 | ............. G10L 13/08 |

OTHER PUBLICATIONS

Kaneko, Takuhiro, et al. "Maskcyclegan-vc: Learning non-parallel voice conversion with filling in frames." ICASSP 2021-2021 IEEE International Conference on Acoustics, Speech and Signal Processing (ICASSP). IEEE, 2021. (Year: 2021).*

Y. Bando, M. Mimura, K. Itoyama, K. Yoshii, and T. Kawahara, "Statistical Speech Enhancement Based on Probabilistic Integration of Variational Autoencoder and Non-Negative Matrix Factorization," in ICASSP 2018, 2018. doi: 10.1109/ICASSP.2018.8461530 (Year: 2018).*

Y. Bando, K. Sekiguchi, and K. Yoshii, "Adaptive Neural Speech Enhancement with a Denoising Variational Autoencoder," in Interspeech 2020, 2020. doi: 10.21437/Interspeech.2020-2291. (Year: 2020).*

S. Leglaive, X. Alameda-Pineda, L. Girin, and R. Horaud, "A Recurrent Variational Autoencoder for Speech Enhancement," in ICASSP 2020, 2020. doi: 10.1109/ICASSP40776.2020.9053164. (Year: 2020).*

H. Fang, G. Carbajal, S. Wermter, and T. Gerkmann, "Variational Autoencoder for Speech Enhancement with a Noise-Aware Encoder," in ICASSP 2021, 2021. doi: 10.1109/ICASSP39728.2021.9414060 (Year: 2021).*

S. Leglaive, U. Simsekli, A. Liutkus, L. Girin, and R. Horaud, "Speech Enhancement with Variational Autoencoders and Alpha-Stable Distributions," in ICASSP 2019, 2019. doi: 10.1109/ICASSP.2019.8682546. (Year: 2019).*

Hirokazu Kameoka et al., ACVAE-VC: Non-Parallel Voice Conversion With Auxiliary Classifier Variational Autoencoder, IEEE/ACM Transactions on Audio, Speech, and Language Processing, vol. 27, No. 9, Sep. 2019, pp. 1432-1443.

Takuhiro Kaneko et al, Maskcyclegan-VC: Learning Non-Parallel Voice Conversion With Filling in Frames, IEEE ICASSP, Jun. 11, 2021, pp. 5919-5923.

* cited by examiner

| Method | Acoustic feature | MCD[dB] |
|---|---|---|
| Auto-VC | mel-spectrogram | 9.21±0.06 |
| CDVAE-VC | mel-cepstrogram | 8.23±0.09 |
| StarGAN-VC | mel-spectrogram | 8.42±0.09 |
| ACVAE-VC | mel-cepstrogram | 8.11±0.08 |
| ACVAE-VC | mel-spectrogram | 7.09±0.08 |

Fig. 4

| Method | Model | DA | MCD[dB] |
|---|---|---|---|
| Auto-VC | – | – | 7.95±0.10 |
| StarGAN-VC | – | – | 8.43±0.12 |
| CNN(Proposed) | ACVAE | | 7.58±0.13 |
| | ACVAE | ✓ | 7.73±0.13 |
| | MaskACVAE | | 7.66±0.13 |
| | MaskACVAE | ✓ | 7.84±0.13 |
| RNN(Proposed) | ACVAE | | 7.67±0.12 |
| | ACVAE | ✓ | 7.74±0.13 |
| | MaskACVAE | | 7.79±0.13 |
| | MaskACVAE | ✓ | 7.47±0.12 |

Fig. 5

| Method | Model | DA | MCD[dB] |
|---|---|---|---|
| CNN(Proposed) | ACVAE | | 8.23±0.15 |
| | ACVAE | ✓ | 7.85±0.13 |
| | MaskACVAE | | 8.25±0.13 |
| | MaskACVAE | ✓ | 7.89±0.13 |
| RNN(Proposed) | ACVAE | | 8.08±0.13 |
| | ACVAE | ✓ | 7.82±0.10 |
| | MaskACVAE | | 7.93±0.12 |
| | MaskACVAE | ✓ | 7.84±0.11 |

Fig. 7

SIGNAL ANALYSIS SYSTEM, SIGNAL ANALYSIS METHOD AND PROGRAM

CROSS-REFERENCE TO RELATED APPLICATIONS

This application is a 371 U.S. National Phase of International Application No. PCT/JP2022/006523, filed on Feb. 18, 2022. The entire disclosure of the above application is incorporated herein by reference.

TECHNICAL FIELD

The present invention relates to a signal analysis system, a signal analysis method and a program.

BACKGROUND ART

In voice conversion, non-linguistic information and paralinguistic information included in input acoustic signals are converted after linguistic information included in the input acoustic signals is held in some cases. Such voice conversion can be applied to various tasks such as text voice combination, voice recognition, voice assistance, and voice quotation. Parallel data (a parallel corpus) is used for machine learning of voice conversion (acoustic conversion). Hereinafter, a conversion target acoustic signal is referred to as a "target acoustic signal".

In the parallel data, speech content of input acoustic signals is the same as the speech content of target acoustic signals. Therefore, since collecting parallel data incurs a cost, it is difficult to collect parallel data. In the non-parallel voice conversion, parallel data is not necessary. Therefore, it is easier to collect non-parallel data than to collect the parallel data. Therefore, non-parallel voice conversion has attracted attention. In the non-parallel voice conversion, a generative adversarial network (GAN) or a variational autoencoder (VAE) is used in some cases.

As methods of non-parallel voice conversion based on a generative adversarial network, there are methods using StarGAN and CycleGAN. In the method using StarGAN, attribute information of an input acoustic signal and attribute information of a target acoustic signal may each be a plurality of pieces of information.

In a learning stage of machine learning, a converter (conversion network) and a classifier (identification network) perform adversarial learning. For example, the classifier determines whether a waveform signal input to the classifier is a signal obtained by converting an input acoustic signal or an input acoustic signal. Here, as one of the learning criteria, there is a cyclic consistency loss. It is known that a cyclic consistency loss is important to retain language information in voice conversion.

As one of non-parallel voice conversion based on a variational autoencoder, there is voice conversion with a conditional variational autoencoder (CVAE). An encoder of the conditional variational autoencoder is trained to extract an acoustic feature independent from the attribute information (conversion target) from the input acoustic signal. A decoder of the conditional variational autoencoder is trained to reconstruct (restore) the input acoustic signal using the attribute information and the extracted acoustic feature.

The trained conditional variational autoencoder replaces the attribute information input to the decoder with the attribute information of a target acoustic signal. Accordingly, the input acoustic signal can be converted into the target acoustic signal.

As various extensions, application of vector quantization (VQ) to a feature space, combined use of a learning criterion (cyclic consistency loss) similar to the learning criterion of CycleGAN, and application of a learning criterion based on an autoencoder have been proposed.

For example, as an extension of non-parallel voice conversion by a conditional variational autoencoder, there is voice conversion (acoustic conversion) with an auxiliary classifier variational autoencoder (ACVAE-VC) based on an auxiliary classifier (classifier) variational autoencoder (see Non Patent Document 1). In ACVAE-VC, an auxiliary classifier variational autoencoder (ACVAE) adds regularization to a learning criterion. Accordingly, attribute information (a conversion target) is not ignored in a conversion process. For example, the effectiveness of ACVAE-VC is shown for a task of converting a voice attribute (for example, voice quality or the like) of a speaker.

CITATION LIST

Non Patent Document

Non Patent Document 1: H.Kameoka, T.Kaneko, K. Tanaka, and N. Hojo, "ACVAE-VC: Non-Parallel Voice Conversion With Auxiliary Classifier Variational Autoencoder," IEEE/ACM Trans. ASLP, vol. 27, no. 9, pp. 1432-1443, 2019.

SUMMARY OF INVENTION

Technical Problem

Apart from the task of converting a voice attribute of a speaker, there is a task of converting a speech style of a speaker. The task of converting a speech style has attracted attention not only in the field of voice conversion but also in the field of text voice combination, for example. As an example of conversion of a speech style, a signal analysis system converts an acoustic signal of a whispering voice into an acoustic signal of a normal voice using ACVAE-VC. Here, the normal voice is a voice that is not a whispering voice. In ACVAE-VC, a mel-cepstrum coefficient (mel-cepstrum coefficient sequence) is used as an acoustic feature (feature of voice). A world vocoder generates a target acoustic signal (time domain signal) using the mel-cepstrum coefficient.

However, since pitch information included in a whispering voice is small, it is difficult to extract an acoustic feature of the whispering voice in the task of converting the whispering voice into a normal voice. Therefore, language information included in the acoustic signal (input acoustic signal) of the whispering voice input to the signal analysis system is ignored in a generated target acoustic signal in some cases.

The signal analysis system uses a mel-cepstrum coefficient so that while a hearer near the speaker cannot hear a whispering voice, a person to whom information is to be transmitted can hear the whispering voice. Here, since clarity of the whispering voice is lower than clarity of the normal voice, it is necessary to convert the whispering voice into the normal voice so that a hearer of a target to whom information is to be transmitted can easily hear the information.

However, pitch information of the whispering voice is less than pitch information of the normal voice. Therefore, it is necessary to generate the pitch information in voice conversion. Further, voice power of the whispering voice is considerably lower than voice power of the normal voice.

Therefore, sound conversion robust against external noise is required. As described above, accuracy of an acoustic feature of the whispering voice cannot be improved in some cases.

In view of the above circumstances, an object of the present invention is to provide a signal analysis system, a signal analysis method, and a program capable of improving accuracy of an acoustic feature of a whispering voice.

Solution to Problem

According to an aspect of the present invention, a signal analysis system includes: an acquisition unit configured to acquire a conversion network trained by using a sequence of a first mel-spectrogram in a machine learning scheme of acoustic conversion based on a classifier variational autoencoder; and a converter that converts a sequence of the second mel-spectrogram of the input acoustic signal into a sequence of the third mel-spectrogram of the target acoustic signal using the conversion network.

According to another aspect of the present invention, a signal analysis method performed by the foregoing signal analysis system includes: a step of acquiring a conversion network trained by using a sequence of a first mel-spectrogram in a machine learning scheme of acoustic conversion based on a classifier variational autoencoder; and a step of converting a sequence of the second mel-spectrogram of the input acoustic signal into a sequence of the third mel-spectrogram of the target acoustic signal using the conversion network.

According to still another aspect of the present invention, a program causes a computer to function as the foregoing signal analysis system.

Advantageous Effects of Invention

According to the present invention, it is possible to improve accuracy of an acoustic feature of a whispering voice.

BRIEF DESCRIPTION OF DRAWINGS

FIG. 4 is a diagram illustrating a result example of mel-cepstrum distortion of an acoustic signal in which speaker characteristics are converted in each embodiment.

FIG. 5 is a diagram illustrating a result example of mel-cepstrum distortion of an acoustic signal into which a whispering voice is converted in an environment where there is no noise in each embodiment.

FIG. 7 is a diagram illustrating a result example of mel-cepstrum distortion of an acoustic signal into which a whispering voice is converted in an environment where there is noise in each embodiment.

DESCRIPTION OF EMBODIMENTS

Embodiments of the present invention will be described in detail with reference to the drawings.

First Embodiment

Figure 1:
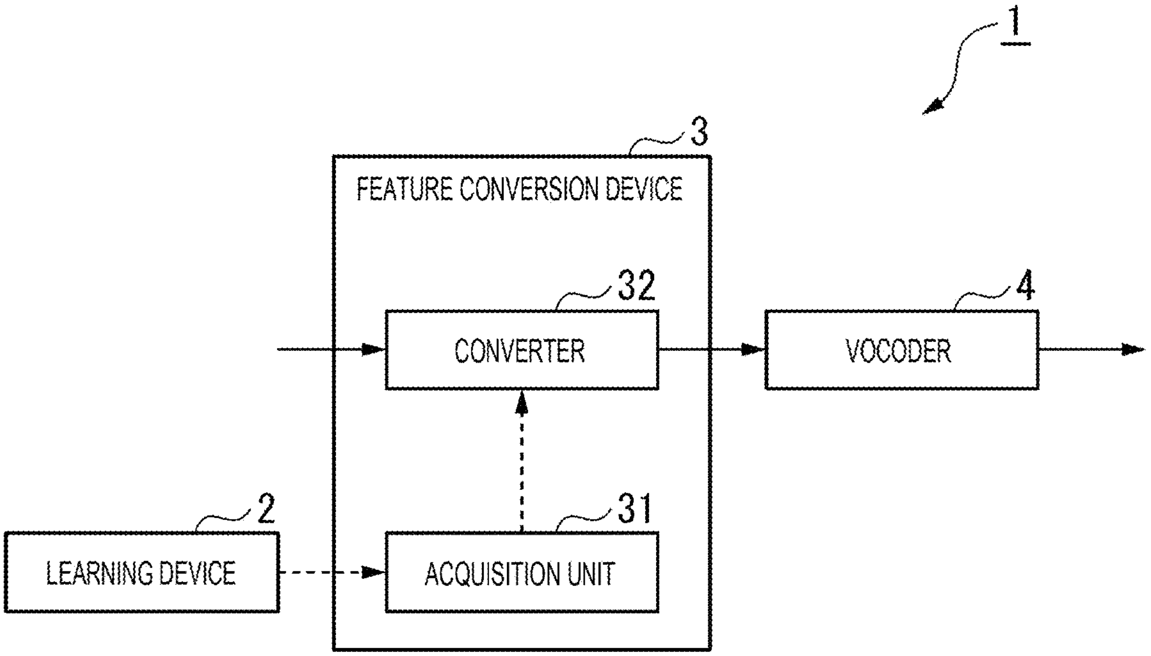
FIG. 1 is a diagram illustrating a configuration example of a signal analysis system according to a first embodiment.

FIG. 1 is a diagram illustrating a configuration example of a signal analysis system 1 according to a first embodiment. The signal analysis system 1 is a signal processing system that generates an acoustic feature (second acoustic feature) of a target acoustic signal based on an acoustic feature (first acoustic feature) of an input acoustic signal, attribute information of the input acoustic signal, and attribute information of the target acoustic signal. The signal analysis system 1 generates a target acoustic signal based on a sequence of acoustic features of the target acoustic signals. Hereinafter, the acoustic signal is, for example, a voice signal.

The signal analysis system 1 includes a learning device 2, a feature conversion device 3, and a vocoder 4. The feature conversion device 3 includes an acquisition unit 31 and a converter 32.

In a learning stage, the signal analysis system 1 learns network parameters of an encoder of the learning device 2, network parameters of a decoder of the learning device 2, and network parameters of an auxiliary classifier of the learning device 2 by using a machine learning scheme of voice conversion (acoustic conversion) (ACVAE-VC) based on an auxiliary classifier variational autoencoder. The signal analysis system 1 converts an acoustic feature sequence of the input acoustic signals into an acoustic feature sequence of the target acoustic signals using the network parameters of the encoder and the network parameters of the decoder.

In ACVAE-VC scheme, the signal analysis system 1 uses a mel-spectrogram as an acoustic feature instead of using a mel-cepstrum coefficient. By using the mel-spectrogram as the acoustic feature, the vocoder 4 can convert a mel-spectrogram of the input acoustic signal of the whispering voice into a natural target acoustic signal (time domain signal) of the normal voice.

A condition for determining whether the input acoustic signal is an input acoustic signal of the whispering voice may be determined in advance. For example, when pitch information or voice power of the input acoustic signal is less than a threshold, it may be determined that the input acoustic signal is an input acoustic signal of the whispering voice.

ACVAE-VC scheme will be described.

Figure 2:
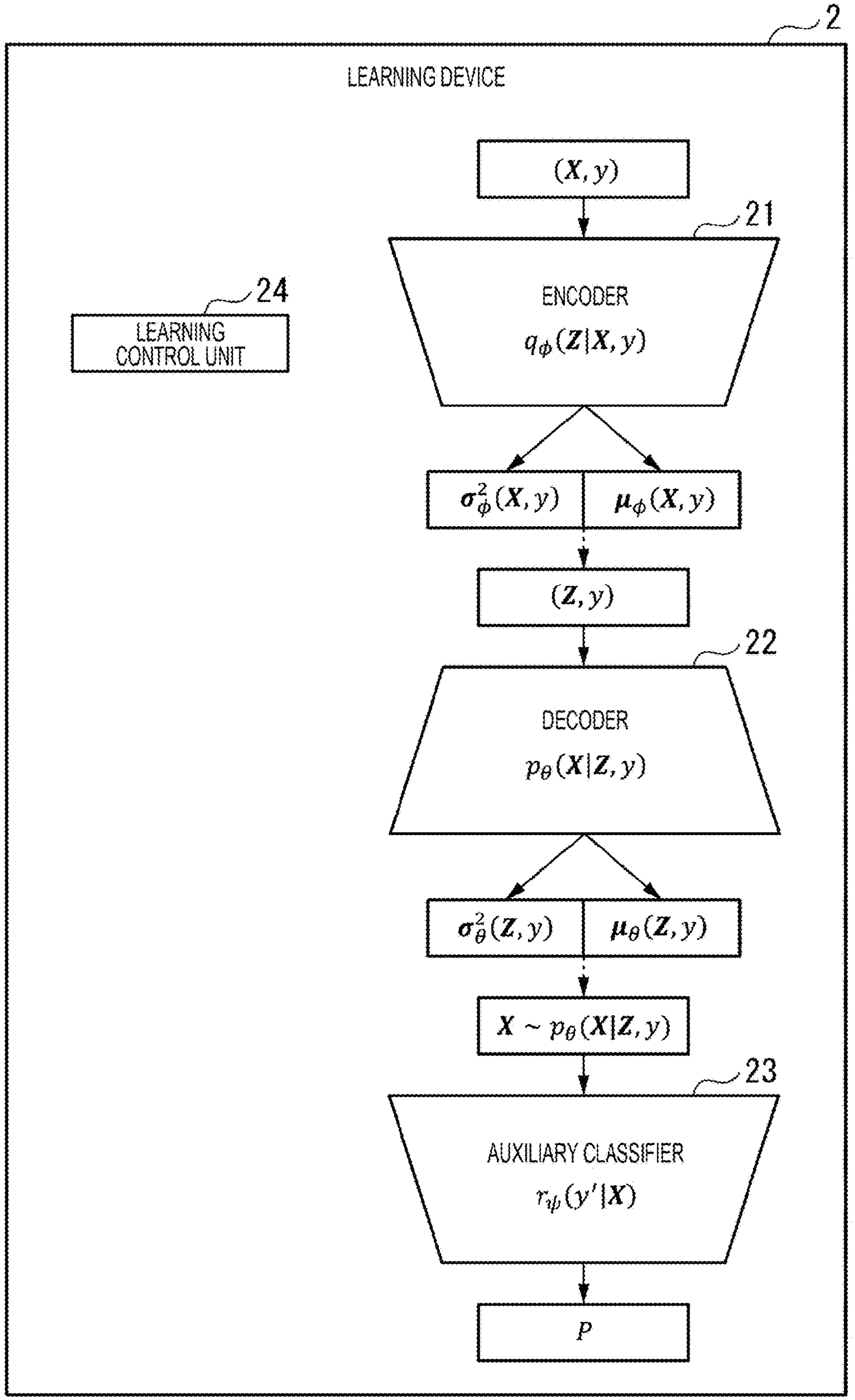
FIG. 2 is a diagram illustrating a configuration example of a learning device according to the first embodiment.

FIG. 2 is a diagram illustrating a configuration example of the learning device 2 according the first embodiment. The learning device 2 includes an encoder 21, a decoder 22, an auxiliary classifier 23 (classifier), and a learning control unit 24. In the learning device 2 (auxiliary classifier variational autoencoder), the encoder 21 and the decoder 22 form a variational autoencoder. The variational autoencoder includes a network (conversion network) that converts the first acoustic feature into the second acoustic feature. The learning control unit 24 controls operations of the encoder 21, the decoder 22, and the auxiliary classifier 23.

Like a conditional variational autoencoder (CVAE), in the variational autoencoder (ACVAE) with the auxiliary classifier 23, it is assumed that a distribution of the network parameters of the encoder 21 and a distribution of the network parameters of the decoder 22 follow a Gaussian distribution.

A distribution "$q_\phi(Z|X, y)$" of the network parameters of the encoder 21 is expressed as Formula (1). Furthermore, the distribution "$p_\theta(X|Z, y)$" of the network parameters of the decoder 22 is expressed as Formula (2).

[Math. 1]

$$q_\phi(Z \mid X, y) = \mathcal{N}(\mu_\phi(X, y), \mathrm{diag}\sigma_\phi^2(X, y)) \tag{1}$$

[Math. 2]

$$p_\theta(X \mid Z, y) = \mathcal{N}(\mu_\theta(Z, y), \mathrm{diag}\sigma_\theta^2(Z, y)) \tag{2}$$

Here, "X" represents a sequence of acoustic features of an acoustic signal. "y" represents attribute information. The attribute information "y" is a conversion target and represents, for example, speaker characteristics and a speech style. The speaker characteristics area voice attribute of a speaker and are, for example, a voice quality. "Z" represents a latent space variable.

"$\phi$" represents a network parameter of the encoder 21. "$\mu_\phi(X, y)$" and "$\sigma^2_\phi(X, y)$" represent an output of the encoder 21. "$\theta$" represents a network parameter of the decoder 22. "$\mu_\theta(Z, y)$" and "$\sigma^2_\theta(Z, y)$" represent the output of the decoder 22.

The variational autoencoder (ACVAE) with the auxiliary classifier 23 learns to maximize a variational lower limit using the variational lower limit exemplified in Formula (3) as a learning criterion.

[Math. 3]

$$\mathcal{J}(\phi, \theta) = \mathbb{E}_{(X,y)\sim p_{\mathcal{D}}(X,y)}\left[\mathbb{E}_{Z\sim q_\phi(Z|X,y)}[\log p_\theta(X \mid Z, y)]\right] - \mathcal{D}_{KL}[q_\phi(Z \mid X, y) \| p(Z)]\Big] \tag{3}$$

Here, "$E_{(X,\ y)\sim PD(X,\ y)}[]$" represents a sample average regarding the learning sample. "$D_{KL}[||]$" represents Kullback-Leivler Divergence (KL information amount). It is also assumed that a prior distribution "p(Z)" follows a standard Gaussian distribution "N(0, I)".

The learning device 2 calculates an expected value of the mutual information amount "I(y; X|Z)" as a learning criterion. Accordingly, an output of the decoder 22 "$X\sim p_\theta(X|Z, y)$" is correlated with the attribute information "y". Since it is difficult to directly use the mutual information amount as the learning criterion, the learning device 2 uses the variational lower limit illustrated in Formula (4) as the learning criterion instead of the mutual information amount.

[Math. 4]

$$\mathcal{J}(\phi, \theta, \psi) = \mathbb{E}_{(X,y)\sim p_{\mathcal{D}}(X,y),Z\sim q_\phi(Z|X,y)}\left[\mathbb{E}_{y'\sim p_{\mathcal{D}}(y'),X\sim p_\theta(X|Z,y')}[\log r_\psi(y' \mid X)]\right] \tag{4}$$

Here, "$r_\psi(y'|X)$" represents a distribution of the network parameters of the auxiliary classifier 23. "$\psi$" represents a network parameter of the auxiliary classifier 23. For an acoustic feature input to the auxiliary classifier 23, the auxiliary classifier 23 determines to which category the attribute information belongs.

Similarly, the learning device 2 uses a cross entropy exemplified in Formula (5) as a learning criterion.

[Math. 5]

$$\mathcal{K}(\psi) = \mathbb{E}_{(X,y)\sim p_{\mathcal{D}}(X,y)}[\log r_\psi(y \mid X)] \tag{5}$$

Accordingly, a final learning criterion in the learning device 2 is expressed as Formula (6).

[Math. 6]

$$\mathcal{J}(\phi, \theta) + \lambda_{\mathcal{J}}\mathcal{J}(\phi, \theta, \psi) + \lambda_{\mathcal{K}}\mathcal{K}(\psi) \tag{6}$$

Here, "$\lambda_J \geq 0$" represents a weight parameter of the variational lower limit. "$\lambda_K \geq 0$" represents a weight parameter of the cross entropy. The learning control unit 24 controls magnitude of regularization in the final learning criterion using "$\lambda_J \geq 0$" and "$\lambda_K \geq 0$".

In an estimation stage, the acquisition unit 31 acquires a network parameter (trained conversion network) learned in the learning stage from the learning device 2. That is, the acquisition unit 31 acquires the network parameter "$\phi$" of the encoder 21 and the network parameter "$\theta$" of the decoder 22 from the learning device 2.

The converter 32 inputs a sequence "$X_s$" of acoustic features of an input acoustic signal and the attribute information "$y_s$" of the input acoustic signal to the trained conversion network of the encoder 21. The conversion network of the encoder 21 generates "$\mu_\phi(X_s, y_s)$" and "$\sigma^2_\phi(X_s, y_s)$".

The converter 32 inputs the "$Z=\mu_\phi(X_s, y_s)$" generated by the encoder 21 and the attribute information "$y_t$" of a target acoustic signal to the trained conversion network of the decoder 22. The conversion network of the decoder 22 generates "$\mu_\theta(Z, y_t)$" and "$\sigma^2_\theta(Z, y_t)$".

In this way, the converter 32 converts the sequence of the acoustic features (mel-cepstrum coefficient) of the input acoustic signal into the sequence of the acoustic features (mel-cepstrum coefficient) of the target acoustic signal. The decoder 22 outputs a sequence of the acoustic features "$X\sim p_\theta(X|Z, y)$" of the target acoustic signal to the vocoder 4. The sequence of the acoustic features of the target acoustic signal is expressed as Formula (7).

[Math. 7]

$$\hat{X}_t = \mu_\theta(\mu_\phi(X_s, y_s), y_t) \tag{7}$$

The vocoder 4 is, for example, a neural vocoder (Reference Document 1: R R.Yamamoto, E. Song, and J.-M. Kim, "Parallel WaveGAN: A Fast Waveform Generation Model Based on Generative Adversarial Networks with Multi-Resolution Spectrogram," in Proc.ICASSP, pp. 6199 to 6203, 2020).

The vocoder 4 acquires the sequence of the acoustic features of the target acoustic signal from the feature conversion device 3. The vocoder 4 converts a sequence of acoustic features "$\hat{}X_t$" of the target acoustic signal into the target acoustic signal (time domain signal). Accordingly, the vocoder 4 generates the target acoustic signal.

In this way, the signal analysis system 1 performs voice conversion using the mel-spectrogram as the acoustic features. It is easier to extract the mel-spectrogram than to extract the mel-cepstrum coefficients. In addition, the mel-spectrogram can be used not only for a world vocoder but also for a high-performance neural vocoder. Therefore, it can be expected that the high-performance neural vocoder synthesizes a high-quality target acoustic signal.

Next, an operation example of the signal analysis system 1 will be described.

Figure 3:
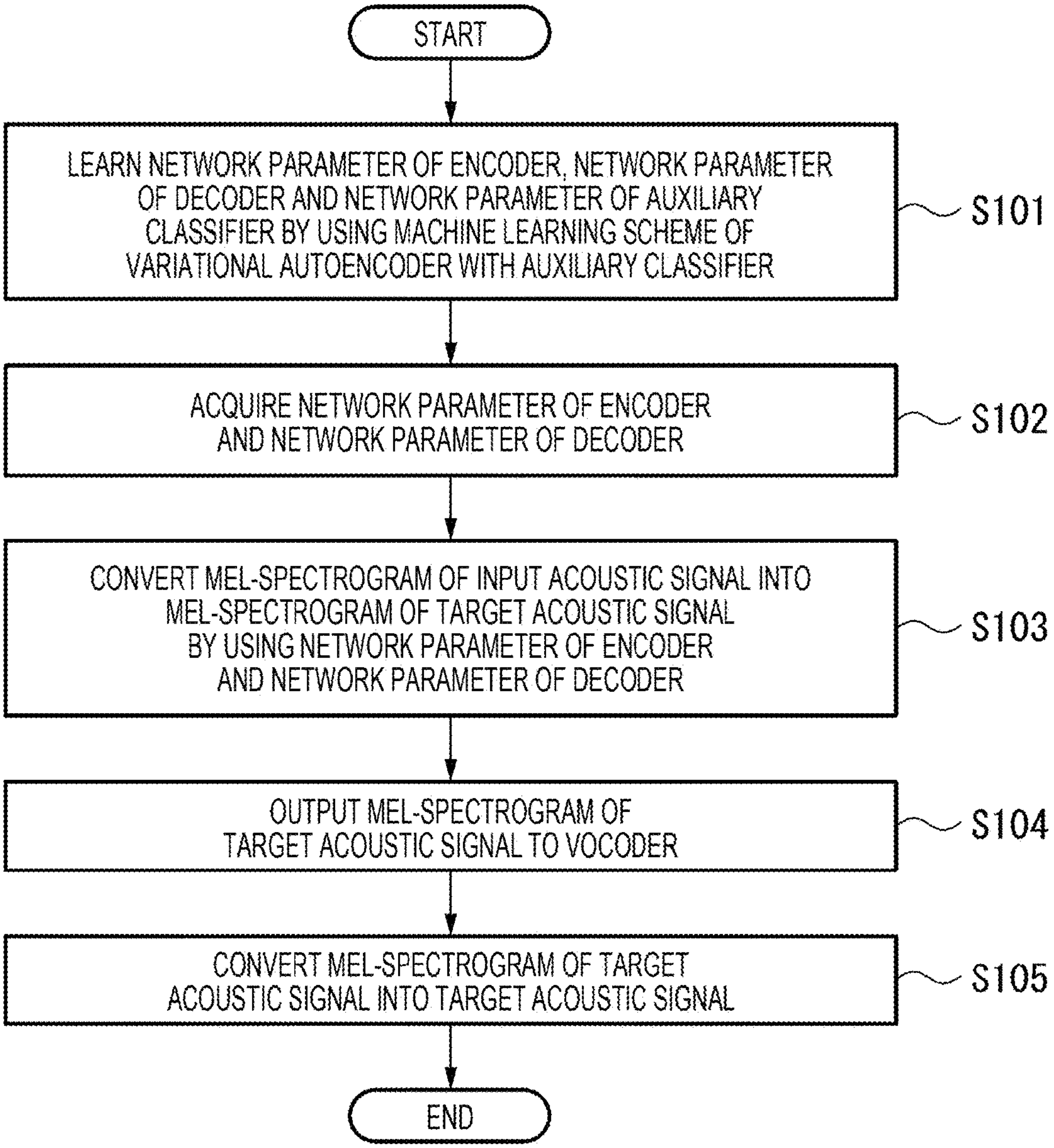
FIG. 3 is a flowchart illustrating an operation example of the signal analysis system according to the first embodiment.

FIG. 3 is a flowchart illustrating an operation example of the signal analysis system 1 according to the first embodiment. In the learning stage, the learning device 2 learns the network parameter "ϕ" of the encoder 21, the network parameter "θ" of the decoder 22, and the network parameter "ψ" of the auxiliary classifier 23 by using the machine learning scheme of the voice conversion (acoustic conversion) (ACVAE-VC) based on the variational autoencoder with the auxiliary classifier 23 and the mel-spectrogram of the acoustic signal for learning (non-parallel data) (step S101).

In the estimation stage, the acquisition unit 31 acquires the network parameter "ϕ" of the encoder 21 and the network parameter "θ" of the decoder 22 from the learning device 2 (step S102). The converter 32 converts the mel-spectrogram and the attribute information of the input acoustic signal into the mel-spectrogram and the attribute information of the target acoustic signal using the network parameter of the encoder 21 and the network parameter of the decoder 22 (step S103). The converter 32 outputs the mel-spectrogram and the attribute information of the target acoustic signal to the vocoder 4 (step S104). The vocoder 4 converts a sequence of the mel-spectrogram "^$X_t$" of the target acoustic signal into the target acoustic signal (step S105).

As described above, the acquisition unit 31 (acquisitor) acquires the conversion network (network parameter) trained by using the sequence of the first mel-spectrogram in the machine learning scheme of the voice conversion (acoustic conversion) (ACVAE-VC) with the classifier variational autoencoder from the learning device 2. The converter 32 converts a sequence of a second mel-spectrogram of the input acoustic signal into a sequence of a third mel-spectrogram of the target acoustic signal using the conversion network.

As described above, the signal analysis system 1 uses the mel-spectrogram as the acoustic feature instead of using the mel-cepstrum coefficient. Accordingly, it is possible to improve accuracy of the acoustic feature of a whispering voice. It is possible to convert the whispering voice into a natural acoustic signal. It is possible to make it difficult to be affected by external noise.

Second Embodiment

The second embodiment is different from the first embodiment in that an auxiliary classifier variational autoencoder complements a missing frame of a sequence of acoustic features. In the second embodiment, differences from the first embodiment will be mainly described.

In ACVAE-VC, the signal analysis system 1 may apply a task of complementing a missing frame in a sequence of acoustic features to an auxiliary classifier variational autoencoder as an auxiliary task. The auxiliary task is, for example, filling in frames (FIF) disclosed in MaskCycleGAN-VC (Reference Document 2: T. Kaneko, H. Kameoka, K. Tanaka, and N. Hojo, "MaskCycleGAN-VC: Learning Non-parallel Voice Conversion with Filling in Frames", in Proc.ICASSP, pp. 5919 to 5923, 2021).

In the second embodiment, the FIF is applied to an auxiliary classifier variational autoencoder. Hereinafter, an auxiliary classifier variational autoencoder (ACVAE) to which an auxiliary task of complementing the missing frame is applied is referred to as "MaskACVAE".

In a learning stage, a mask for intentionally missing some of adjacent frames in a sequence of acoustic features (mel-spectrogram) is prepared in advance. Such a mask and a sequence of acoustic features in which some frames are missing are input to the conversion network. MaskACVAE is caused to learn network parameters of the conversion network so that the conversion network outputs original acoustic features by complementing the missing frames with the sequence of acoustic features in which some frames are missing. Accordingly, since information regarding a frame direction is taken into consideration, the network parameters of the conversion network are learned so that a structure of a time frequency is more efficiently extracted from an acoustic signal.

In this way, the auxiliary task of complementing the missing frames is solved in the learning stage, and thus the conversion network in which the information regarding the frame direction is further taken into consideration is generated. In an estimation stage, the converter 32 extracts the structure of the time frequency more efficiently by using the conversion network in which the information regarding the frame direction is more taken into consideration.

The variational autoencoder (ACVAE) with the auxiliary classifier 23 performs learning using the FIF. In MaskACVAE, a sequence "X" of acoustic features (original acoustic features) of an input acoustic signal to the encoder 21 is corrected through mask processing. Accordingly, a distribution of the network parameters of the encoder 21 is replaced with a distribution illustrated in Formula (8).

[Math. 8]

$$q_\phi(Z \mid M \odot X, M, y) = \mathcal{N}\left(\mu_\phi(M \odot X, M, y), \operatorname{diag}\sigma_\phi^2(M \odot X, M, y)\right) \quad (8)$$

Here, "M" represents a mask for a sequence of acoustic features. The operator of the symbol "o" including the symbol "." at the center represents a matrix product for each element.

In MaskACVAE, in the learning stage, the network parameters are learned by comparing the acoustic features reconstructed by the decoder 22 with the original acoustic features. In the estimation stage after the learning stage, the converter 32 converts the acoustic features of the input acoustic signal into the acoustic features of the target acoustic signal using a mask (mask in which all elements are 1) that generates no missing frame by a matrix product.

In MaskCycleGAN (see Reference Document 2), in the learning stage, the acoustic features into which the masked acoustic features are converted are compared with the original acoustic features through a circulating conversion process.

As described above, the classifier variational autoencoder performs learning of the conversion network by using the task of complementing the missing frames in the sequence of the first mel-spectrogram.

Accordingly, it is possible to improve accuracy of the acoustic feature of a whispering voice. By learning the auxiliary task, more natural prosodic information can be obtained since a relationship of a more global acoustic signal is learned.

Third Embodiment

The third embodiment is different from the first and second embodiments in that a noise elimination task is included in a learning criterion. The noise elimination task is a task of estimating an acoustic signal with no noise (clean acoustic signal) from an acoustic signal with noise (noisy acoustic signal). In the third embodiment, differences from the first embodiment and the second embodiment will be mainly described.

A whispering voice is collected along with background noise (external noise) in some cases. In these cases, voice conversion performance deteriorates due to the collected background noise. Accordingly, learning data is expanded for the purpose of improving robustness against noise.

An acoustic signal with noise and an acoustic signal with no noise are generated in advance as learning data. The acoustic signal with noise is an acoustic signal in which background noise is artificially superimposed on an acoustic signal with no noise.

A desired signal-to-noise ratio (SNR) range is predetermined. In the learning stage, the learning control unit 24 randomly selects a numerical value within the predetermined signal-to-noise ratio range. The learning control unit 24 superimposes a noise signal on the acoustic signal according to the selected numerical value. The learning control unit 24 inputs the input acoustic signal on which the noise signal is superimposed to the conversion network. The learning control unit 24 may input the input acoustic signal on which no noise signal is superimposed to the conversion network.

In this way, the classifier variational autoencoder performs learning of the conversion network by using the sequence of the mel-spectrogram of the acoustic signal on which the noise signal is superimposed.

Accordingly, it is possible to improve accuracy of the acoustic feature of a whispering voice. Sound conversion robust against external noise is possible.

Advantageous Effects

A result of a voice conversion experiment from a whispering voice to a normal voice under each environment where there is no noise and under each environment where there is noise, and a conversion experiment of attribute information (speaker characteristics) will be described below.

A whispering voice and a normal voice were recorded for Japanese speech sentences (503 sentences) spoken by one speaker (man). For each recorded voice (whispering voices and normal voices), 450 speeches were set as learning data in the learning stage. For each recorded voice, 53 speeches were used as test data in the estimation stage.

Environmental sound signals included in a data set "The WSJ0 Hipster Ambient Mixture (WHAM!)" were used as noise signals. By superimposing a noise signal in a range of 4 dB to 6 dB on the test data, a whispering voice in a noise environment was generated.

A 80-dimensional mel-spectrogram was extracted from the test data (input acoustic signal) under analysis conditions that a sampling frequency is "16 KHz", a frame length is "64 ms", and a shift length is "8 ms".

The conversion network of the first network structure, the conversion network of a second network structure, and each conversion network in the encoder 21 and the decoder 22 are prepared.

The first network structure is a structure based on a convolutional neural network (CNN). The encoder 21 includes a convolutional neural network that has three convolution layers and three deconvolution layers. Similarly, the decoder 22 includes a convolutional neural network that has three convolution layers and three deconvolution layers.

The second network structure is a structure based on a recurrent neural network (RNN). The encoder 21 includes a two-layer recursive neural network and a one-layer fully connected layer. Similarly, the decoder 22 includes a two-layer recursive neural network and a one-layer fully connected layer.

The auxiliary classifier 23 includes a four-layer gated convolutional neural network. In learning of the network parameter "$\phi$" of the encoder 21 and the learning of the network parameter "$\theta$" of the decoder 22, "$\lambda_J=1$" and "$\lambda_K=1$" were used as the weight parameters. In learning of the network parameter "$\psi$" of the auxiliary classifier 23, "$\lambda_J=1$" and "$\lambda_K=1$" were used as the weight parameters.

As an optimization algorithm, an adaptive moment estimation (Adam) algorithm was used. Learning rates of the encoder 21 and the decoder 22 are "$1.0\times10^{-3}$". A learning rate of the auxiliary classifier 23 is "$2.5\times10^{-5}$". The number of learning epochs is 1000. In MaskACVAE, a mask was generated using a length randomly selected from a length of "768 ms" or less as the length of a missing frame. In data extension, a voice with noise was generated in a signal-to-noise ratio range from 0 dB to 10 dB. "Parallel WaveGAN" (see Reference Document 1) was used as a neural vocoder necessary for signal waveform combination.

CDVAE-VC (Reference Document 3: W.-C. Huang, H.-T. Hwang, Y.-H. Peng, Y. Tsao, and H.-M. Wang, "Voice Conversion Based on Cross-Domain Features Using Variational Auto Encoders," in Proc.ISCSLP, pp. 51 to 55, 2018), StarGAN-VC (Reference Document 4: H. Kameoka, T. Kaneko, K. Tanaka, and N. Hojo, "StarGAN-VC: non-parallel many-to-many Voice Conversion Using Star Generative Adversarial Networks", in Proc. SLT, pp. 266 to 273, 2018.), and AutoVC (Reference Document 5: K.Qian, Y. Zhang, S. Chang, X. Yang, and M. Hasegawa-Johnson, "AutoVC: Zero-Shot Voice Style Transfer with Only Autoencoder Loss", in Proc.ICML, pp. 5210 to 5219, 2019.) were used as schemes to be compared with regard to conversion of speaker characteristics. In addition, StarGAN-VC (see Reference Document 4) and AutoVC (see Reference Document 5) have been used as schemes to be compared with regard to voice conversion of a whispering voice in an environment where there is no noise.

In objective assessment, mel-cepstral distance (MCD) was used as a measure of conversion performance. In subjective evaluation, a mean opinion score (MOS) regarding quality and clarity of a converted voice was used as an evaluation measure of conversion performance.

FIG. 4 is a diagram illustrating a result example of mel-cepstrum distortion of an acoustic signal in which speaker characteristics are converted in each embodiment. The conversion performance of "ACVAE-VC" (mel-cepstrum) is greater than the conversion performance of each method to be compared. The conversion performance of "ACVAE-VC" (mel-spectrogram) is greater than the conversion performance of "ACVAE-VC" (mel-cepstrum).

Accordingly, the conversion performance of "ACVAE-VC" (mel-spectrogram) is the highest.

FIG. 5 is a diagram illustrating a result example of mel-cepstrum distortion (objective evaluation result) of an acoustic signal into which a whispering voice is converted in an environment where there is no noise in each embodiment. "DA" illustrated in FIG. 5 indicates whether there is data extension in which a noise signal is used. Between the schemes to be compared and "ACVAE-VC" (mel-spectrogram), the conversion performance of "ACVAE-VC" (mel-spectrogram) is consistently greater in the objective evaluation "MCD".

Figure 6:
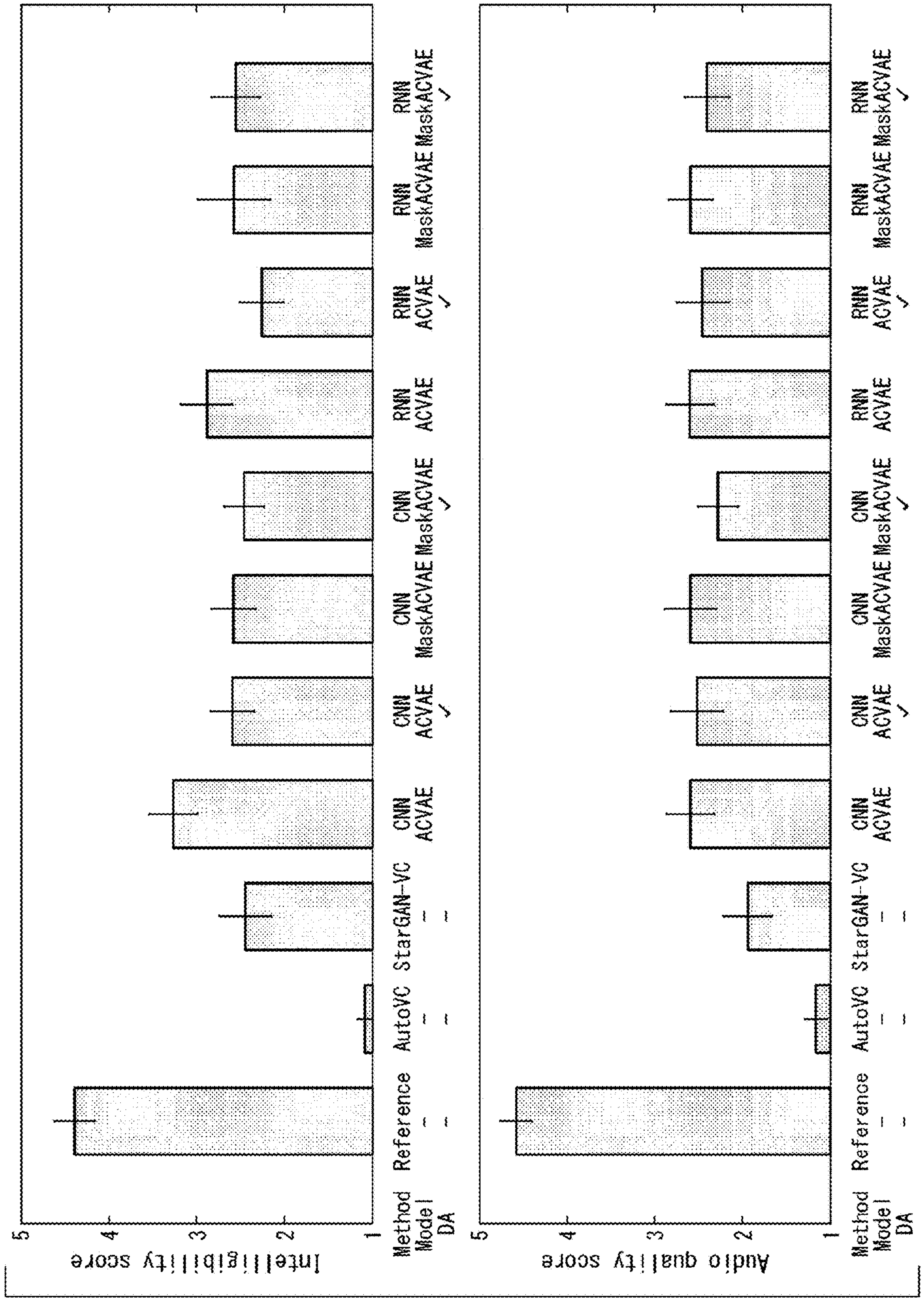
FIG. 6 is a diagram illustrating a result example of an average intelligibility score of an acoustic signal into which a whispering voice is converted in an environment where there is no noise in each embodiment.

FIG. 6 is a diagram illustrating a result example of an average intelligibility score (subjective evaluation result) of an acoustic signal into which a whispering voice is converted in an environment where there is no noise in each embodiment. The upper part of FIG. 6 shows an average intelligibility score regarding clarity. The lower part of FIG. 6 shows an average audio quality score regarding audio quality. In the subjective evaluation, the conversion performance of "ACVAE-VC" (mel-spectrogram) is also equal to or greater than the conversion performance of each method to be compared.

FIG. 7 is a diagram illustrating a result example of mel-cepstrum distortion (objective evaluation result) of an acoustic signal into which a whispering voice is converted in an environment where there is noise in each embodiment. "DA" illustrated in FIG. 7 indicates whether there is data extension in which a noise signal is used. It was confirmed that the conversion performance was improved by using the data extension in which a noise signal is used.

Figure 8:
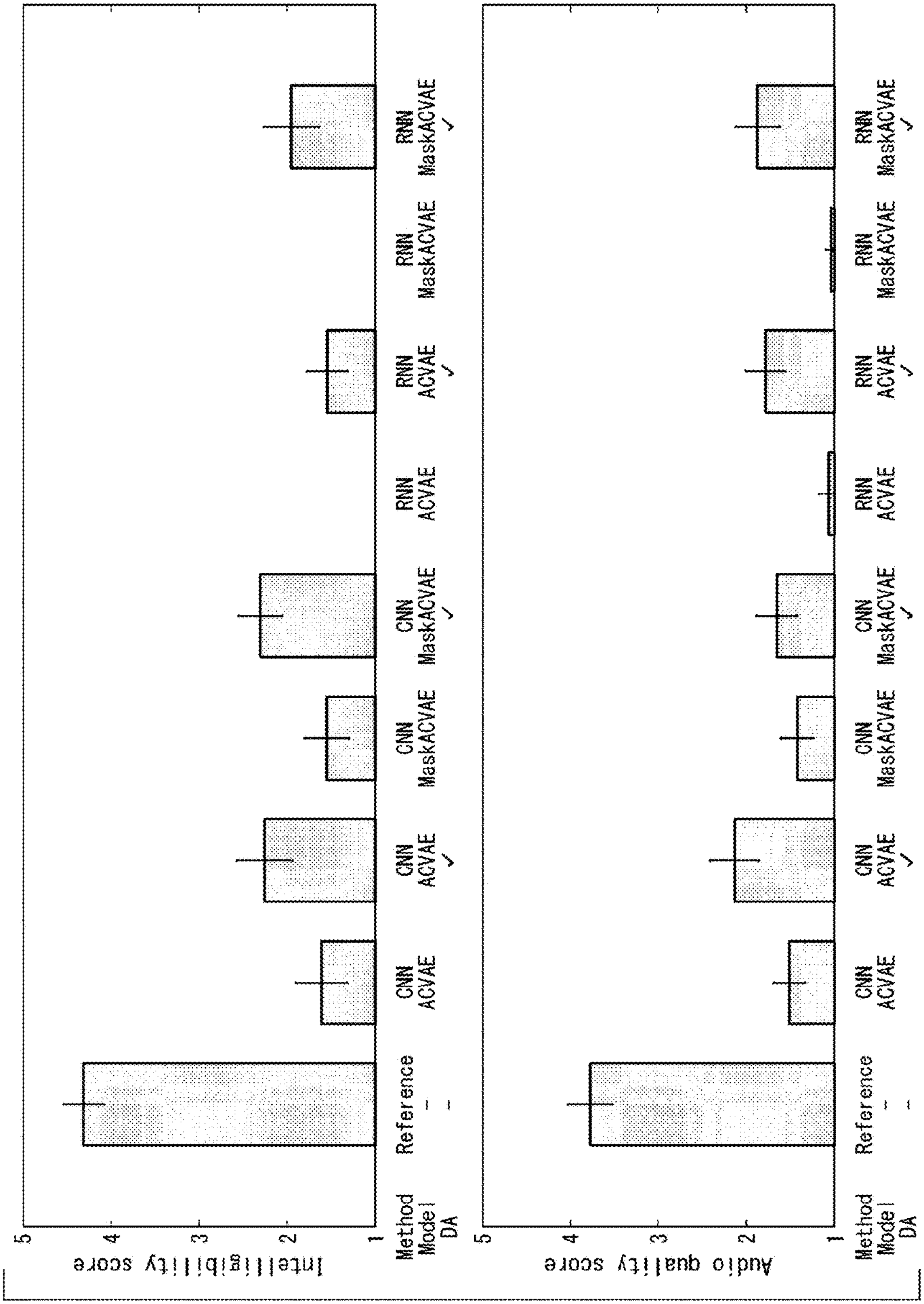
FIG. 8 is a diagram illustrating a result example of an average intelligibility score of an acoustic signal into which a whispering voice is converted in an environment where there is noise in each embodiment.

FIG. 8 is a diagram illustrating a result example of an average intelligibility score (subjective evaluation result) of an acoustic signal into which a whispering voice is converted in an environment where there is noise in each embodiment. The upper part of FIG. 8 shows an average intelligiblity score regarding the clarity. The lower part of FIG. 8 shows an average audio quality score regarding the audio quality. It was shown that clarity of a converted voice can be improved by using MaskACVAE for a network structure based on a recursive neural network (RNN). In this way, it was shown that the signal analysis system 1 was effective.

Hardware Configuration Example

Figure 9:
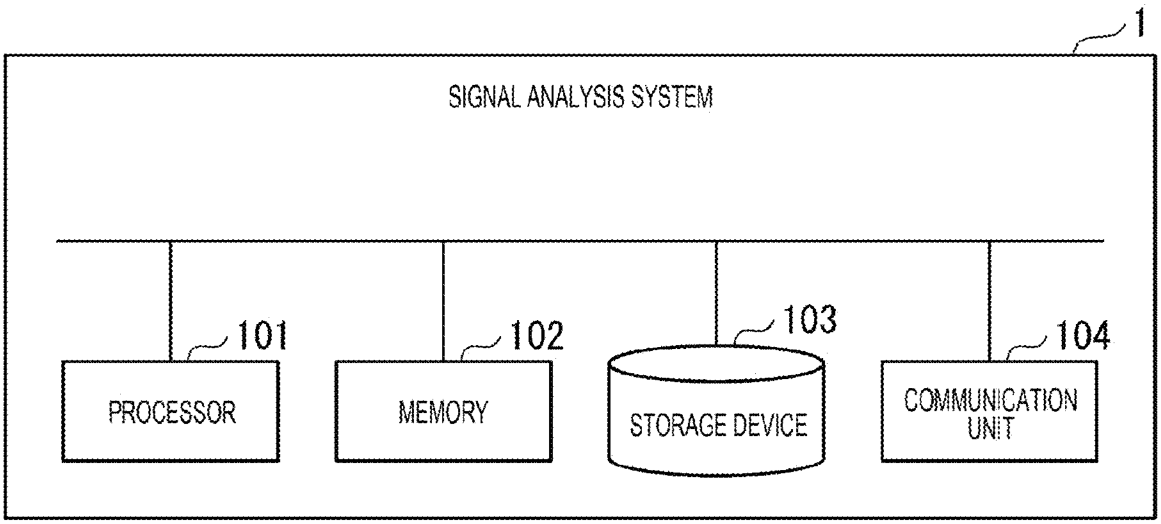
FIG. 9 is a diagram illustrating a hardware configuration example of a signal analysis system according to each embodiment.

FIG. 9 is a diagram illustrating a hardware configuration example of the signal analysis system 1 according to the embodiment. Some or all of the functional units of the signal analysis system 1 are implemented as software by a processor 101 such as a central processing unit (CPU) executing a program stored in a memory 102 and a storage device 103 including a nonvolatile recording medium (non-transitory recording medium). The program may be recorded in a computer-readable non-transitory recording medium. The computer-readable non-transitory recording medium is, for example, a portable medium such as a flexible disk, a magneto-optical disk, a read only memory (ROM), or a compact disc read only memory (CD-ROM), or a non-transitory recording medium such as a storage device such as a hard disk built in a computer system. The communication unit 104 performs a predetermined communication process. The communication unit 104 may acquire data such as an acoustic signal (waveform signal) and a program.

Some or all of the functional units of the signal analysis system 1 may be implemented using, for example, hardware including an electronic circuit (electronic circuit or circuitry) in which a large scale integrated circuit (LSI), an application specific integrated circuit (ASIC), a programmable logic device (PLD), a field programmable gate array (FPGA), or the like is used.

Although the embodiments of the present invention have been described in detail with reference to the drawings, specific configurations are not limited to the embodiments, and include a design and the like within a range without departing from the gist of the present invention.

Industrial Applicability

The present invention can be applied to a machine learning and signal processing system that converts a voice.

REFERENCE SIGNS LIST

1 Signal analysis system
2 Learning device
3 Feature conversion device
4 Vocoder
21 Encoder
22 Decoder
23 Auxiliary classifier
24 Learning control unit
31 Acquisition unit
32 Converter
101 Processor
102 Memory
103 Storage device
104 Communication unit

The invention claimed is:

1. A signal analysis system comprising:

a processor; and a storage medium having computer program instructions stored thereon, when executed by the processor, perform to:

acquire a conversion network trained by using a sequence of a first mel-spectrogram in a machine learning scheme of acoustic conversion based on an auxiliary classifier variational encoder with voice conversion; and converts a sequence of a second mel-spectrogram of an input acoustic signal of a whispering voice into a sequence of a third mel-spectrogram of a target acoustic signal using the conversion network, wherein the auxiliary classifier variational encoder with voice conversion performs learning of the conversion network by using the sequence of the first mel-spectrogram of the acoustic signal on which a noise signal is superimposed according to a randomly selected numerical value within a predetermined signal-to-noise ratio range.

2. The signal analysis system according to claim 1, wherein the auxiliary classifier variational encoder with voice conversion performs learning of the conversion network using a task of complementing a missing frame in the sequence of the first mel-spectrogram.

3. The signal analysis system according to claim 1, wherein the auxiliary classifier variational encoder with voice conversion performs learning of the conversion network using a sequence of the first mel-spectrogram of the acoustic signal on which the noise signal is superimposed.

4. A signal analysis method performed by a signal analysis system, the method comprising:

acquiring a conversion network trained by using a sequence of a first mel-spectrogram in a machine learning scheme of acoustic conversion based on an auxiliary classifier variational encoder with voice conversion; and converting a sequence of a second mel-spectrogram of an input acoustic signal of a whispering voice into a sequence of a third mel-spectrogram of a target acoustic signal using the conversion network, wherein the auxiliary classifier variational encoder with voice conversion performs learning of the conversion network by using the sequence of the first mel-spectrogram of the acoustic signal on which a noise signal is superimposed according to a randomly selected numerical value within a predetermined signal-to-noise ratio range.

5. A non-transitory computer readable medium which stores a program causing a computer to function as the signal analysis system according to claim 1.

* * * * *